United States Patent
Ainasoja et al.

(10) Patent No.: US 11,852,478 B2
(45) Date of Patent: Dec. 26, 2023

(54) TROWEL AND A METHOD FOR USING THE TROWEL AND A LASER LEVEL

(71) Applicant: KA-TUOTE OY, Metsakansa (FI)

(72) Inventors: Jari Ainasoja, Valkeakoski (FI); Timo Knuutila, Metsakansa (FI)

(73) Assignee: KA-TUOTE OY, Metsakansa (FI)

( * ) Notice: Subject to any disclaimer, the term of this patent is extended or adjusted under 35 U.S.C. 154(b) by 0 days.

(21) Appl. No.: 17/997,826

(22) PCT Filed: Apr. 15, 2021

(86) PCT No.: PCT/FI2021/050278
§ 371 (c)(1),
(2) Date: Nov. 3, 2022

(87) PCT Pub. No.: WO2021/224543
PCT Pub. Date: Nov. 11, 2021

(65) Prior Publication Data
US 2023/0243651 A1     Aug. 3, 2023

(30) Foreign Application Priority Data

May 5, 2020   (FI) .................................... 20205461

(51) Int. Cl.
*E04F 21/24*   (2006.01)
*G01C 15/00*   (2006.01)
*G01C 9/06*    (2006.01)

(52) U.S. Cl.
CPC ............ *G01C 15/006* (2013.01); *E04F 21/24* (2013.01); *G01C 9/06* (2013.01)

(58) Field of Classification Search
CPC .......... G01C 15/006; G01C 9/06; E04F 21/24
(Continued)

(56) References Cited

U.S. PATENT DOCUMENTS 4,319,406 A * 3/1982 Pehrson, Sr. ............ G01B 5/25
33/657
6,640,378 B2 * 11/2003 Hsu ........................ E04F 21/06
16/DIG. 18

(Continued)

FOREIGN PATENT DOCUMENTS

CN      206269817 U    6/2017
EP      0291132 A1    11/1988
(Continued)

OTHER PUBLICATIONS

Machine Generated English Translation of JPH07173925, Published on Sep. 7, 1995, 7 pages. (Year: 1995).*

*Primary Examiner* — Michael D Jennings
*Assistant Examiner* — Shantese L McDonald

(57) ABSTRACT

A trowel (10) is equipped with an optical detector (13) that detects a laser beam (12). The optical detector (13) may be arranged detect the laser beam (12) only when aligned with the laser beam (12). The trowel (10) provides feedback to the user when it detects the laser beam (12) and when it does not. The feedback may be a sound, a light or a haptic feedback. When the trowel (10) is used for constructing a tapered floor, such as in a bathroom, the laser beam (12) may be originated from a laser level (40) arranged on a support (30). The support (30) is positioned inside a floor drain (32), for example a bathroom floor drain (32).

4 Claims, 5 Drawing Sheets

(58) Field of Classification Search
USPC .................................. 15/235.4, 235.8, 143.1
See application file for complete search history.

(56) References Cited

U.S. PATENT DOCUMENTS

| | | | | |
|---|---|---|---|---|
| 6,762,830 | B1* | 7/2004 | Connolly | G01C 15/004 |
| | | | | 356/138 |
| 2004/0123472 | A1* | 7/2004 | Wu | G01C 15/004 |
| | | | | 33/286 |
| 2015/0308825 | A1* | 10/2015 | Dumoulin | G01C 9/06 |
| | | | | 356/139.1 |
| 2019/0338537 | A1 | 11/2019 | Black et al. | |

FOREIGN PATENT DOCUMENTS

| | | | | |
|---|---|---|---|---|
| JP | H07173925 | * | 7/1995 | ............. E04F 21/24 |
| JP | 2011153423 A | | 8/2011 | |
| KR | 101937886 B1 | | 1/2019 | |

* cited by examiner

TROWEL AND A METHOD FOR USING THE TROWEL AND A LASER LEVEL

BACKGROUND

The invention relates to finishing work on buildings. Tapered floors are required for example in bathrooms, shower floors or in places where water should controllably flow into a drain. Constructing tapered floors may require manual labour or manual tools as rooms have different shapes. Traditionally the tools have been a trowel, a levelling board, a plank or a stick with a straight edge and a level. The builder may have guide lines drawn at the wall, indicating the final height of the floor cement.

The floor cement may easily block all markings on the wall. In the beginning of the levelling the excess amount of cement blocks the wall markings. The process may consume a lot of time as the builder has to check repeatedly that the floor slopes are at a proper angle and the tapering is even. Laser levels are not usable at the cement's plane, therefore the quality depends on builder's skills.

JP2011153423A discloses a concrete placement reference height display device and method for leveling surface of placed concrete.

US2019338537A1 discloses a trowel and/or float having a utilitarian and adjustable level built-in for ease of use and creating uniform, properly angled, smooth surfaces, and replaceable undersides for creating various effects.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A trowel is equipped with an optical detector that detects a laser beam. The optical detector may be arranged to detect the laser beam only when it is aligned with the laser beam. The trowel provides feedback to the user when it detects the laser beam and when it does not. The feedback may be a sound, a light or a haptic feedback.

When the trowel is used for constructing a tapered floor, such as in a bathroom, the laser beam may be originated from a laser level arranged on a novel support. The support is positioned inside a floor drain, for example a bathroom floor drain. The support blocks the drain from debris during the construction. The support has adjustable height and/or angle for the laser level, enabling the laser to travel, from the laser level to the trowel, above the floor cement to be levelled. The laser level and the trowel may have matching vertical offsets to the desired floor level.

The trowel may be kept in full control during the sweeping motion. Traditionally, liner planks, alignment sticks or elevation markers have been used to ensure correct floor slope at various positions; also levelling boards having sharp edges have been used between the liner planks or alignment sticks. When the laser ensures the correct position of the trowel, additional process steps are not required. Also, the whole floor may be finalized at one single step without having to return to fix traces from the removed elevation markers or liner planks. The trowel blade may be long, comparable to the length of the levelling board.

With the laser-equipped trowel system, the builder may achieve better quality in shorter time. When the floor is finished for laying floor tiles, the high-quality and even floor makes all the following tasks easier. Smooth floor enables the floor tiles to be at the same plane. The tapered floor is easier to cover with rectangular floor tiles, as there are less inconsistencies.

Many of the attendant features will be more readily appreciated as they become better understood by reference to the following detailed description considered in connection with the accompanying drawings. The embodiments described below are not limited to implementations which solve any or all the disadvantages of trowels or laser level systems.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented by a trowel, they are provided as an example and not a limitation. As those skilled in the art will appreciate, the present examples are suitable for application in a variety of different types of levelling tools that are used for levelling cement, mud, dry-mix compound or other similar building materials.

Figure 1:
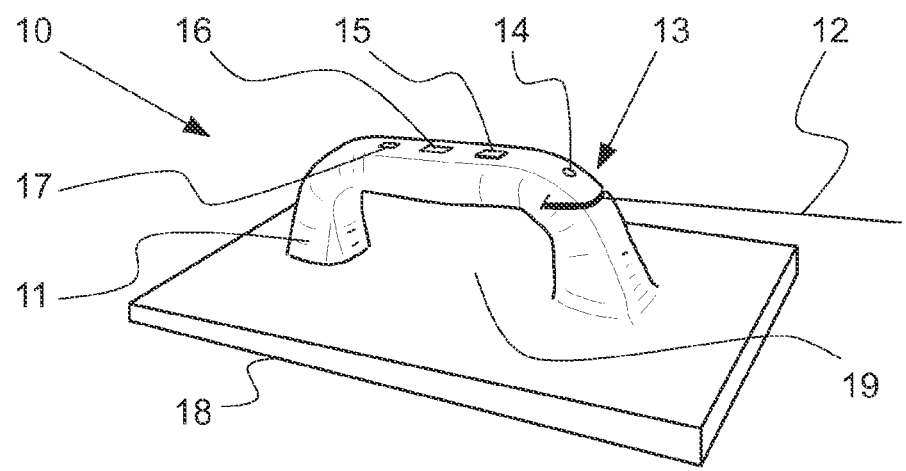
FIG. 1 illustrates schematically one exemplary embodiment of a trowel.

One exemplary embodiment of the trowel 10 is illustrated schematically in FIG. 1. The trowel 10 comprises a body 19 and a handle 11 for a user to manually move the trowel 10 and, for example, level a floor by a blade 18. In one embodiment the handle 11 is integrated to the body 19. In one embodiment the handle 11 is detachable from the body 10. The blade 18 may be interchangeable.

The trowel 10 also comprises an optical detector 13 configured to detect a laser beam 12. In FIG. 1 the optical detector 13 is not illustrated as it is positioned inside the handle 11. The optical detector 13 converts the incoming laser beam 12 into an electrical signal. The optical detector 13 may be a photon detector, a thermal detector, a semiconductor, a photovoltaic cell or any other electrical component suitable to be used at a construction tool. In one embodiment the trowel 10 comprises two optical detectors 13 facing opposite ends of the trowel 10. In one embodiment the trowel 10 comprises two optical detectors 13 positioned at opposite ends of the trowel 10, but facing the same direction. The optical detector 13 may be attached to any position in the trowel 10, to the handle 13 or to the body 19. As the handle 13 and the 19 body may be integrated, the definition between the handle 13 and the body 19 is not always precise. In one exemplary embodiment the optical detector 13 is at a raised position on the trowel 10.

A feedback device 14, 16, 17 is configured to provide feedback to the user whether or not the optical detector 13 is detecting the laser beam 12. The feedback device 14, 16, 17 comprises a controller configured to receive the electric signal from the optical detector 13. The feedback device 14, 16, 17 comprises at least one user interface for signalling the information to the user. In one embodiment the feedback device comprises a speaker 16 for providing sonic feedback to the user. In one embodiment the feedback device comprises a signal light 14 for providing visual feedback to the user. In one embodiment the feedback device comprises a vibration motor 17 for providing haptic feedback to the user. Although in the present example the vibration motor 17 is illustrated outside the handle 11, the vibration motor may be positioned inside the handle 11.

In one embodiment the trowel 10 comprises a switch 15 for activating the optical detector 13. The switch 15 may be an on-off switch. The switch 15 may be a push button or a trigger that engages the optical detector 13 while the user is pushing the button or pulling the trigger. The user activation allows the user to receive feedback only when desired, for example only during the sweeping motion.

The feedback enables the user to keep the trowel 10 in the line of the laser beam 12 or at the plane defined by a laser level 40. The user is aware at all times where the correct plane is. The trowel 10 may be used to finalize levelling a dry-mix compound for the floor, wall or other surfaces. The present examples disclose the usage in bathroom floor levelling, where tapered surfaces are required to enable water flowing into the drain. The bathroom floor or shower floor may contain complex slopes that go around various corners. Correct placement of the laser level 40 enables quick trowel 10 operation.

Figure 2A:
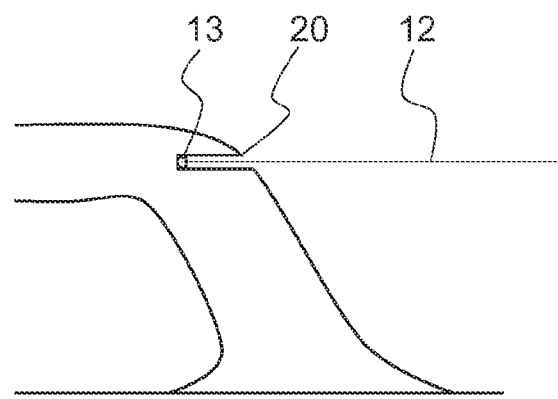
FIG. 2a illustrates schematically a laser beam being detected by an optical detector of one exemplary embodiment.

The user may ensure that the trowel 10 is also at a correct angle. FIG. 2a illustrates schematically one example, where the laser beam 12 travels directly into the optical detector 13. In this example the trowel 10 is at the same plane with the laser beam 12. In one embodiment the trowel 10 comprises an alignment element 20 in front of the optical detector 13 for aligning the trowel 10 with the laser beam 12. In the example the alignment element 20 is an aperture allowing the laser beam 12 to reach the optical detector 13 only from a predetermined plane. In the illustrated example the aperture 20 is exaggerated to explain the functionality. The aperture 20 may be fixed or adjustable. The aperture 20 may comprise a replaceable element having alternative shapes or apertures in front of the optical detector 13. The aperture 20 may be a slot allowing the laser beam 12 to reach the optical detector 13 from various angles at the plane defined by the laser level 40.

Figure 2B:
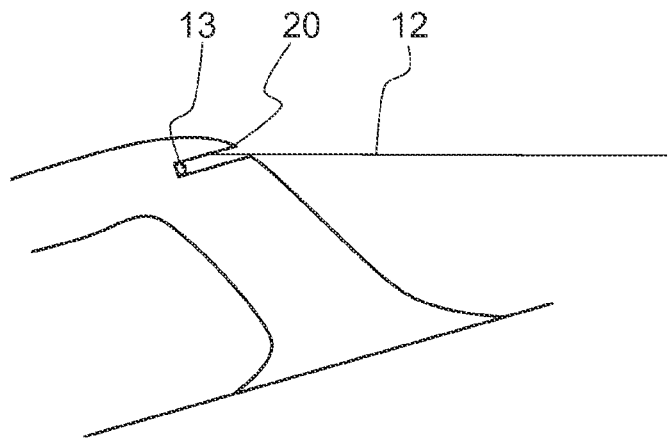
FIG. 2b illustrates schematically a first failed attempt for detecting the laser beam by the optical detector of one exemplary embodiment.
Figure 2C:
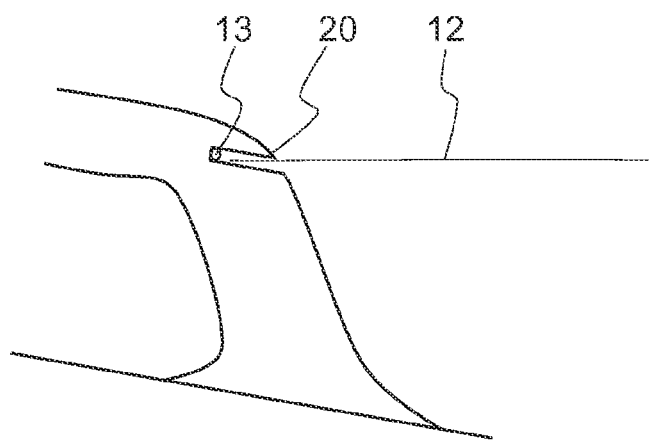
FIG. 2c illustrates schematically a second failed attempt for detecting the laser beam by the optical detector of one exemplary embodiment.

FIG. 2b and FIG. 2c illustrate schematically examples, where the optical detector 13 fails to detect the laser beam 12 as the trowel 10 is not aligned with the laser beam 12. In FIG. 2b the nose of the trowel 10 is too high, and the laser beam 12 meets the upper wall of the aperture 20 before reaching the optical element. In FIG. 2c the nose of the trowel 10 is too low, and as a consequence, the laser beam 12 meets the lower wall of the aperture 20.

In one exemplary embodiment the trowel 10 comprises a level for indicating angle of the trowel 10 to the user. The level may be integrated into the trowel 10 or it may be detachable. The level may be a bubble level or an electronic level utilizing the feedback system 14, 16, 17. The level may be adjustable to indicate various angles. The trowel 10 may comprise a battery integrated into the body 19 or into the handle 11. A replaceable battery may be arranged into a battery compartment.

Figure 3:
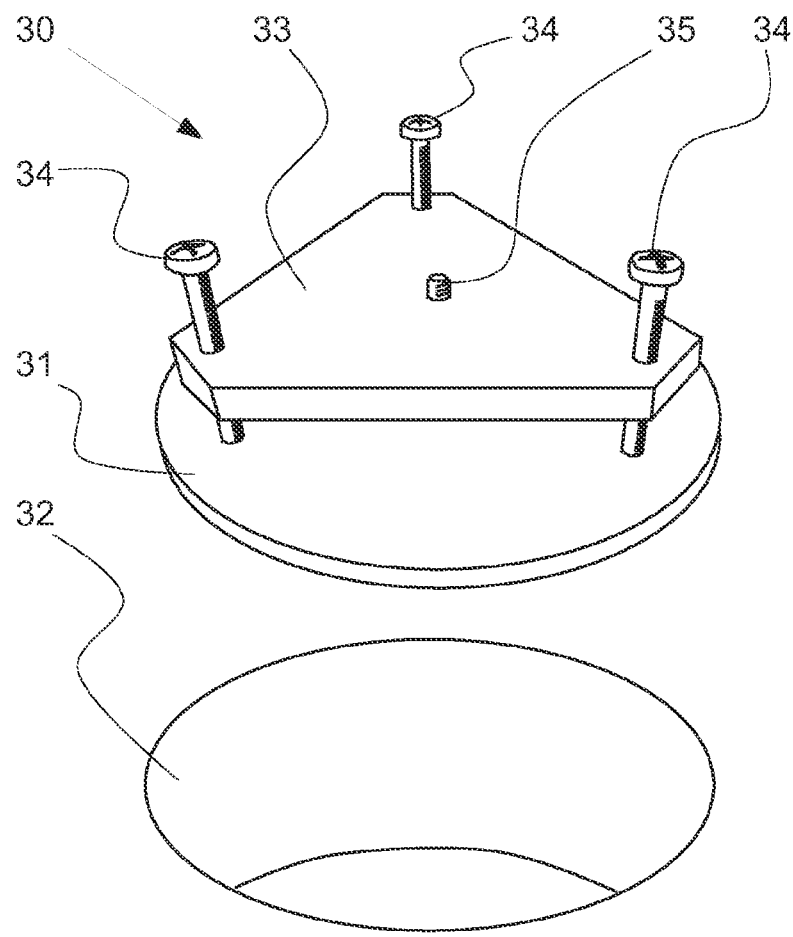
FIG. 3 illustrates schematically of exemplary embodiment of a support for a laser level.
Figure 4:
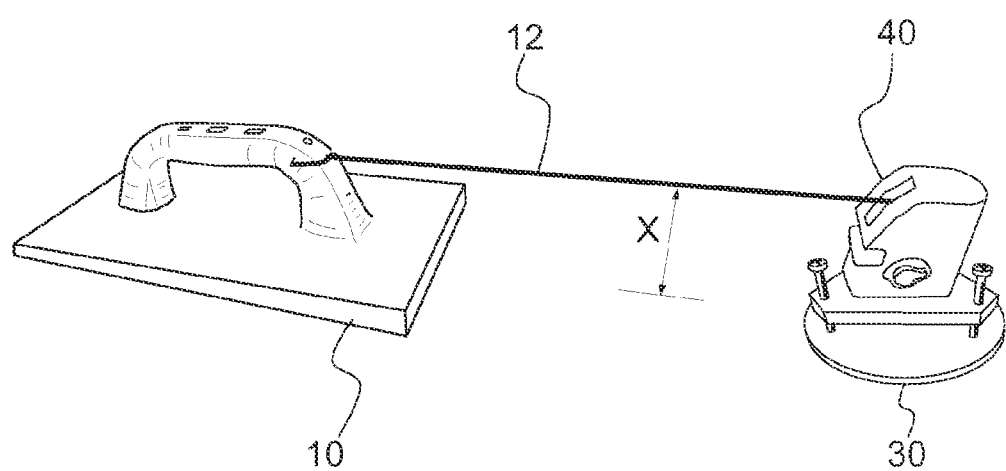
FIG. 4 illustrates schematically one exemplary embodiment of the interaction between the trowel, the laser level and the support.

FIG. 3 illustrates a support 30 for the laser level 40. FIG. 4 illustrates schematically the interaction between the trowel 10, the laser level 40 and the support 30. The support 30 comprises means 35 for attaching the laser level 40 to the support 30, for example a ¼" or ⅜" thread. The support 30 is configured to fit inside a floor drain 32, as the floor drain 32 is supposedly the lower portion of the bathroom floor. The floor should taper towards the drain 32.

The support 30 comprises a sealing surface 31 for sealing the floor drain 32 from debris. The sealing surface 31 is in one embodiment suitable for keeping the support in upright position. The sealing surface 31 is in one embodiment a plate having a flexible edge. The flexible edge may retain the support in place. All dry mix compounds should be kept away from the drain 32 during the construction. At the same time, the support may be positioned low, enabling also the laser level 40 to be positioned low.

The support 30 comprises means 34 for adjusting the vertical distance between the sealing surface 31 and the means 35 for attaching the laser level to the support. The adjustment is a height adjustment and/or a plane angle adjustment. The laser level 40 is connectable to a similar height as is configured to the trowel 10 for receiving the laser beam 12. Referring to FIG. 4, the height adjustment may be used to match the offset X in the height differences between the laser level 40 measured from the drain 32 surface level and the optical detector's 13 vertical distance from the blade 18. The laser beam 12 may travel above the unlevelled cement.

In one embodiment the means 35 for attaching the laser level 40 to the support 30 comprises an adjustable plane angle. The adjustable plane angle may be a single arm extending from the sealing surface 31. The arm may be telescopic, rotatable and/or tiltable connected to the thread 35. In one embodiment the means 35 for attaching the laser level is an adjustable plate 33 configured to support the laser level 40. The plate 33 may be connected to the arm.

In one embodiment the plate 33 is a triangular plate having a vertical threaded rod 34 passing through the triangular plate at each corner for adjusting the distance and angle to the sealing surface 31. The present example has three threaded rods 34. The triangular plate allows the user to make manual adjustments to the rods 34 and locking nuts or washers that may be arranged to support the plate 33.

In one embodiment the plate 33 is rotatable. The plate 33 may be connected to the support 30 by an axis. The axis may be tiltable and/or rotatable. One application for the rotatable plate 33 is the construction of a sand separation well.

In one embodiment the support 30 is configured for rectangular drains, such as those used near the wall. The sealing surface 31 and the plate 33 are modified to match the shape of the rectangular drain. Various shapes for the sealing surface 31 and the plate 33 are possible in the spirit of the claimed subject matter.

In one exemplary embodiment the trowel 10 is a levelling board. The handle 11 may be arranged to the levelling board in various ways. In one exemplary embodiment the handle 11 is arranged on the middle portion of the levelling board. In one exemplary embodiment the handle 11 is arranged as two separate handles at the opposite end portions of the levelling board. In one exemplary embodiment the optical detector 13 is at the end portion of the levelling board. In one exemplary embodiment the levelling board comprises two optical detectors 13 at the opposite end portions of the levelling board. In one exemplary embodiment the length of the blade 18 is comparable to the length of a concrete-levelling board, up to several metres.

Figure 5:
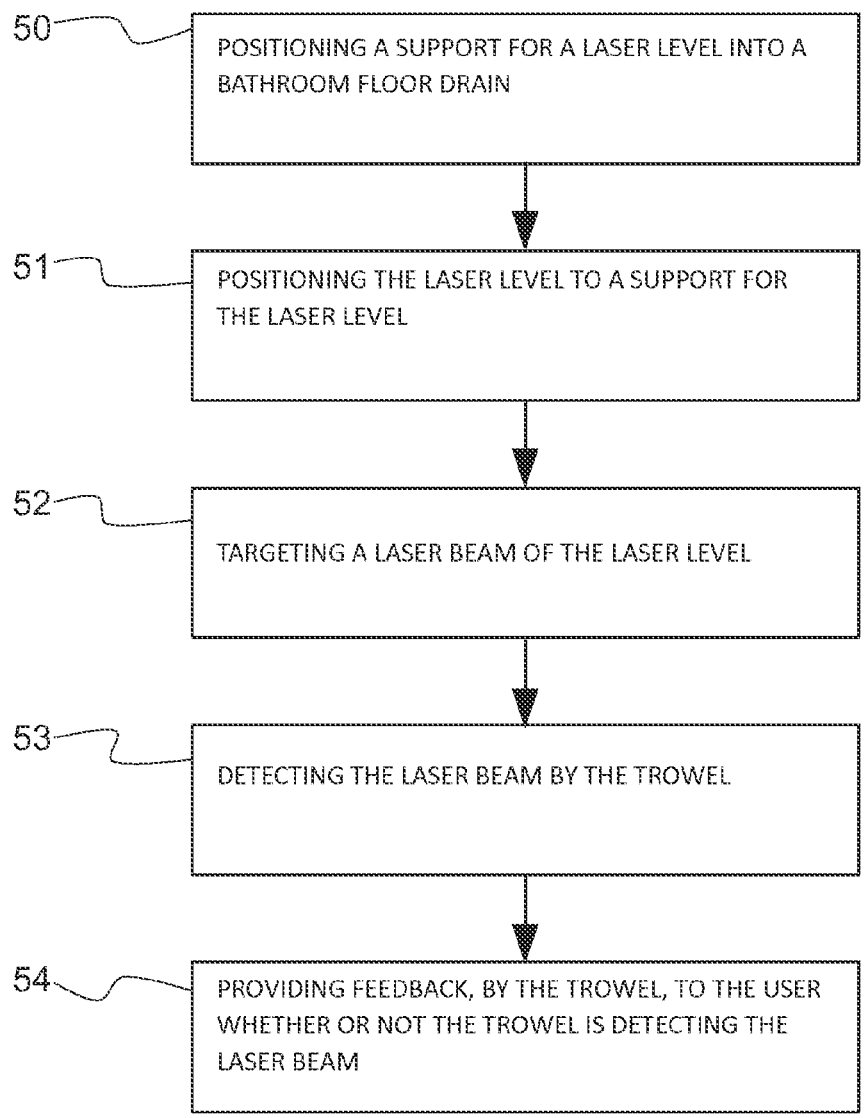
FIG. 5 illustrates as a flowchart steps of a method for using the trowel, the laser level and the support.

FIG. 5 illustrates as a flowchart steps of the method for using a trowel and a laser level. Step 50 comprises positioning the support 30 for the laser level 40 into the floor drain 32. The support 30 is pushed to the floor drain 32, blocking it from receiving any debris on building materials during the construction stage. Step 51 comprises positioning the laser level 40 to the support 30 for the laser level. The height of the laser level 40 from the floor drain 32 surface level is adjusted by the support 30.

In step 52 the laser beam 12 of the laser level 40 is targeted to the room wall. The common offset X of the trowel 10 and the laser level 40 is taken into account when measuring the wall markings with the laser beam 12. The laser beam 12 is targeted according to corners of the room, thereby providing sufficient slope towards the floor drain 32.

In step 53 the trowel 10 is utilized in levelling the floor cement or any other dry mix compound to be levelled. The laser beam 12 is detected by the trowel 10, wherein the correct alignment and plane angle of the trowel 10 are approved in step 54. Feedback is provided by the trowel 10, to the user whether or not the trowel 10 is detecting the laser beam 12.

The trowel 10 and the laser level 40 operated on the support 30 provide elements to a system having a transmitter and a receiver. The elements are synergistic, wherein having each component provides the effect of manufacturing complex, tapered surfaces. As anyone skilled in the construction work will recognize, the system may be applied as a whole, or partially, to other types of surface. For example walls, ceilings or other structures may be levelled with the trowel 10 equipped with the components disclosed herein and a laser level 40.

The trowel 10 and the laser level 40 may be used for various floor shapes. For even, level floors the use is simple, the support 30 may be positioned on the floor or at any position, wherein the support 30 may be used to dial and match the offset X of the floor level plane and the trowel 10 level. Thereby, the laser level 40 may be used below its lowest setting at level floors that have no drains or other means for lowering the laser level 40 below the floor plane.

A trowel is disclosed, comprising a body and a handle for a user to manually move the trowel. The trowel comprises an optical detector configured to detect a laser beam and a feedback device configured to provide feedback to the user whether or not the optical detector is detecting the laser beam. In one embodiment, the feedback device comprises a speaker for providing sonic feedback to the user. In one embodiment, the feedback device comprises a signal light for providing visual feedback to the user. In one embodiment, the feedback device comprises a vibration motor for providing haptic feedback to the user. In one embodiment, the trowel comprises a level for indicating angle of the trowel to the user. In one embodiment, the trowel comprises comprising a switch for activating the optical detector. In one embodiment, the trowel comprises an alignment element in front of the optical detector for aligning the trowel with the laser beam.

Alternatively, or in addition, a support for a laser level is disclosed. The support comprises means for attaching the laser level to the support. The support is configured to fit inside a floor drain. The support further comprises a sealing surface for sealing the floor drain from debris; means for adjusting the vertical distance between the sealing surface and the means for attaching the laser level to the support; wherein the laser level is connectable to a height configured to a trowel for receiving a laser beam. In one embodiment, the means for attaching the laser level to the support comprises an adjustable plane angle. In one embodiment, the means for attaching the laser level is an adjustable plate configured to support the laser level. In one embodiment, the plate is a triangular plate having a vertical threaded rod passing through the triangular plate at each corner for adjusting the distance and angle to the sealing surface.

Alternatively, or in addition, a method for using a trowel and a laser level is disclosed. The method comprises the steps of: positioning a support for a laser level into a floor drain; positioning the laser level to a support for the laser level; targeting a laser beam of the laser level; detecting the laser beam by the trowel; and providing feedback, by the trowel, to the user whether or not the trowel is detecting the laser beam. In one embodiment, the feedback is a sonic feedback. In one embodiment, the feedback is a visual feedback. In one embodiment the method comprises indicating angle of the trowel to the user.

Alternatively, or in addition, the trowel function can be performed, at least in part, by one or more hardware components or hardware logic components. An example of the control system described hereinbefore is a computer-based device comprising one or more processors which may be microprocessors, controllers or any other suitable type of processors for processing computer-executable instructions to control the operation of the device in order to control one or more sensors, receive sensor data and utilize the sensor data. The control system may be positioned on the host system and connected to the apparatus. The computer-executable instructions may be provided using any computer-readable media that is accessible by a computer-based device. Computer-readable media may include, for example, computer storage media, such as memory and communications media. Computer storage media, such as memory, includes volatile and non-volatile, removable and non-removable media implemented in any method or technology for storage of information, such as computer-readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device, it will be appreciated that the storage may be distributed or located remotely and accessed via a network or other communication link, for example, by using a communication interface.

The apparatus or the device may comprise an input/output controller arranged to output display information to a display device which may be separate from or integral to the apparatus or device. The input/output controller is also arranged to receive and process input from one or more devices, such as a user input device (e.g. a mouse, keyboard, camera, microphone or other sensor). The actuator may receive the command to reciprocate the conical member from the input/output controller.

Any range or device value given herein may be extended or altered without losing the effect sought.

Although at least a portion of the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the elements identified, but that such elements do not comprise an exclusive list and an apparatus may contain additional elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A trowel, comprising:
    a body; and
    a handle for a user to manually move the trowel; comprising:
    an optical detector configured to detect a laser beam from a laser level;
    an alignment element in front of the optical detector for aligning the trowel with the laser beam; and
    a feedback device configured to provide feedback to the user whether or not the optical detector is detecting the laser beam; and
    the feedback device comprises at least one of the group of: a speaker for providing sonic feedback to the user, a signal light for providing visual feedback to the user, and a vibration motor for providing haptic feedback to the user;
    wherein the feedback enables the user to keep the trowel in the line of the laser beam or at the plane defined by a laser level.

2. A trowel according to claim 1, comprising a level for indicating angle of the trowel to the user.

3. A trowel according to claim 1, comprising a switch for activating the optical detector.

4. A method for using a trowel and a laser level, comprising the steps of:
    positioning a support for a laser level into a floor drain;
    positioning the laser level to the support for the laser level;
    targeting a laser beam of the laser level;
    detecting the laser beam by the trowel;
    providing feedback, by the trowel, to the user whether or not the trowel is detecting the laser beam; and
    the feedback comprises at least one of the group of: a sonic feedback, a signal light and a haptic feedback;
    wherein the feedback enables the user to keep the trowel in the line of the laser beam or at the plane defined by a laser level.

* * * * *